US010579981B2

(12) United States Patent
Andrews et al.

(10) Patent No.: US 10,579,981 B2
(45) Date of Patent: *Mar. 3, 2020

(54) SELECTING A PREFERRED PAYMENT INSTRUMENT (71) Applicant: GOOGLE LLC, Mountain View, CA (US)

(72) Inventors: Mark William Andrews, San Francisco, CA (US); Michael Blandina, Gilroy, CA (US); Osama Bedier, San Jose, CA (US)

(73) Assignee: Google LLC, Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/592,166

(22) Filed: May 10, 2017

(65) Prior Publication Data
US 2017/0243192 A1 Aug. 24, 2017

Related U.S. Application Data (63) Continuation of application No. 14/743,566, filed on Jun. 18, 2015, now Pat. No. 9,679,284, which is a
(Continued)

(51) Int. Cl.
G06Q 20/22 (2012.01)
G06Q 20/34 (2012.01)
(Continued)

(52) U.S. Cl.
CPC ......... G06Q 20/227 (2013.01); G06Q 10/067 (2013.01); G06Q 20/34 (2013.01); G06Q 20/35785 (2013.01); G06Q 20/367 (2013.01)

(58) Field of Classification Search
None
See application file for complete search history.

(56) References Cited

U.S. PATENT DOCUMENTS 5,221,838 A 6/1993 Gutman et al.
5,537,476 A 7/1996 Coteus et al.
(Continued)

FOREIGN PATENT DOCUMENTS

EP 1 153 375 B1 1/2003
SG 187283 A1 2/2013
(Continued)

OTHER PUBLICATIONS

U.S. Appl. No. 13/542,303 to Mizhen et al. filed Jul. 5, 2012.
(Continued)

Primary Examiner — Robert R Niquette
(74) Attorney, Agent, or Firm — Dority & Manning, P.A.

(57) ABSTRACT

Selecting payment instruments for proxy card transactions comprises associating a plurality of financial accounts with a user proxy account; establishing a model for the user account based on configuration data received from a user, the model comprising identification of a particular financial account to use as a backing instrument for a transaction; receiving data associated with a pending transaction regarding the pending transaction; identifying a financial account to use as a backing instrument for the pending transaction based on a comparison of the model with the pending transaction data; receiving a selection of an alternate financial account to use instead of the identified financial account as the backing instrument; modifying the model account based on the selection of the alternate financial account and the data associated with the pending transaction; and utilizing the modified model in a subsequent selection of a financial account for a subsequent transaction.

21 Claims, 3 Drawing Sheets

Related U.S. Application Data continuation of application No. 13/784,790, filed on Mar. 4, 2013, now Pat. No. 9,092,767.

(51) Int. Cl.
*G06Q 20/36* (2012.01)
*G06Q 10/06* (2012.01)

(56) References Cited

U.S. PATENT DOCUMENTS

| | | | |
|---|---|---|---|
| 5,590,038 A | 12/1996 | Pitroda |
| 5,614,920 A | 3/1997 | Coteus et al. |
| 5,619,219 A | 4/1997 | Coteus et al. |
| 5,881,287 A | 3/1999 | Mast |
| 5,883,810 A | 3/1999 | Franklin et al. |
| 5,884,271 A | 3/1999 | Pitroda |
| 6,000,832 A | 12/1999 | Franklin et al. |
| 6,266,647 B1 | 7/2001 | Fernandez |
| 6,317,650 B1 | 11/2001 | Powell et al. |
| 6,450,407 B1 | 9/2002 | Freeman et al. |
| 6,535,929 B1 | 3/2003 | Provino et al. |
| 6,601,759 B2 | 8/2003 | Fife et al. |
| 6,742,704 B2 | 6/2004 | Fitzmaurice et al. |
| 6,786,400 B1 | 9/2004 | Bucci |
| 6,879,965 B2 | 4/2005 | Fung et al. |
| 6,920,611 B1 | 7/2005 | Spaeth et al. |
| 6,961,941 B1 | 11/2005 | Nelson et al. |
| 7,065,651 B2 | 6/2006 | Evans |
| 7,073,070 B2 | 7/2006 | Girard |
| 7,181,744 B2 | 2/2007 | Shultz et al. |
| 7,197,648 B2 | 3/2007 | Evans |
| 7,203,310 B2 | 4/2007 | England et al. |
| 7,206,940 B2 | 4/2007 | Evans et al. |
| 7,257,811 B2 | 8/2007 | Hunt et al. |
| 7,272,726 B2 | 9/2007 | Evans |
| 7,284,135 B2 | 10/2007 | Evans et al. |
| 7,293,178 B2 | 11/2007 | Evans et al. |
| 7,299,365 B2 | 11/2007 | Evans |
| 7,302,586 B2 | 11/2007 | Evans |
| 7,337,328 B2 | 2/2008 | Evans |
| 7,337,329 B2 | 2/2008 | Evans |
| 7,346,909 B1 | 3/2008 | Eldar et al. |
| 7,363,265 B2 | 4/2008 | Horgan |
| 7,380,130 B2 | 5/2008 | England et al. |
| 7,401,731 B1 | 7/2008 | Pletz et al. |
| 7,421,533 B2 | 9/2008 | Zimmer et al. |
| 7,490,324 B2 | 2/2009 | Shultz et al. |
| 7,600,267 B2 | 10/2009 | Bauchot et al. |
| 7,619,622 B2 | 11/2009 | de Souza et al. |
| 7,620,984 B2 | 11/2009 | Kallahalla et al. |
| 7,631,184 B2 | 12/2009 | Ryan |
| 7,634,664 B2 | 12/2009 | Ibrahim et al. |
| 7,657,759 B2 | 2/2010 | Rubin et al. |
| 7,688,719 B2 | 3/2010 | Rehm |
| 7,689,926 B2 | 3/2010 | de Souza et al. |
| 7,702,578 B2 | 4/2010 | Fung et al. |
| 7,716,377 B2 | 5/2010 | Harris et al. |
| 7,739,191 B2 | 6/2010 | Sutton et al. |
| 7,739,417 B2 | 6/2010 | Liu et al. |
| 7,752,436 B2 | 7/2010 | Grobman et al. |
| 7,766,244 B1 | 8/2010 | Field et al. |
| 7,768,522 B2 | 8/2010 | Stauffer et al. |
| 7,788,713 B2 | 8/2010 | Grobman et al. |
| 7,797,748 B2 | 9/2010 | Zheng et al. |
| 7,801,814 B2 | 9/2010 | Cataline et al. |
| 7,802,000 B1 | 9/2010 | Huang et al. |
| 7,809,652 B2 | 10/2010 | Dixon et al. |
| 7,865,414 B2 | 1/2011 | Fung et al. |
| 7,870,153 B2 | 1/2011 | Croft et al. |
| 7,890,422 B1 | 2/2011 | Hirka et al. |
| 7,900,005 B2 | 3/2011 | Kotsovinos et al. |
| 7,922,083 B2 | 4/2011 | Harrison et al. |
| 7,941,539 B2 | 5/2011 | Tripathi et al. |
| 7,949,677 B2 | 5/2011 | Croft et al. |
| 7,954,150 B2 | 5/2011 | Croft et al. |
| 7,996,288 B1 | 8/2011 | Stolfo |
| 8,010,667 B2 | 8/2011 | Zhang et al. |
| 8,010,679 B2 | 8/2011 | Low et al. |
| 8,051,180 B2 | 11/2011 | Mazzaferri et al. |
| 8,060,876 B2 | 11/2011 | Smith et al. |
| 8,069,121 B2 | 11/2011 | Goodrich et al. |
| 8,108,641 B2 | 1/2012 | Goss et al. |
| 8,249,257 B2 | 8/2012 | Brutch et al. |
| 8,259,948 B2 | 9/2012 | Smith et al. |
| 8,326,758 B2 | 12/2012 | Bennett |
| 8,341,732 B2 | 12/2012 | Croft et al. |
| 8,392,328 B2 | 3/2013 | Shah et al. |
| 8,401,904 B1 | 3/2013 | Simakov et al. |
| 8,626,592 B2 * | 1/2014 | Simakov ............ G06Q 20/3572 705/16 |
| 8,639,621 B1 | 1/2014 | Ellis et al. |
| 8,924,288 B1 * | 12/2014 | Easley ................. G06Q 40/02 705/35 |
| 9,092,767 B1 | 7/2015 | Andrews et al. |
| 2002/0152156 A1 | 10/2002 | Tyson-Quah |
| 2003/0061157 A1 | 3/2003 | Hirka et al. |
| 2003/0126094 A1 | 7/2003 | Fisher et al. |
| 2003/0140241 A1 | 7/2003 | England et al. |
| 2003/0200435 A1 | 10/2003 | England et al. |
| 2004/0024703 A1 | 2/2004 | Roskind |
| 2004/0049452 A1 | 3/2004 | Blagg |
| 2004/0148255 A1 | 7/2004 | Beck et al. |
| 2004/0225509 A1 | 11/2004 | Andre |
| 2004/0236646 A1 | 11/2004 | Wu et al. |
| 2005/0039180 A1 | 2/2005 | Fultheim et al. |
| 2005/0102671 A1 | 5/2005 | Baumberger |
| 2005/0130680 A1 | 6/2005 | Northcutt |
| 2005/0160424 A1 | 7/2005 | Broussard et al. |
| 2005/0198488 A1 | 9/2005 | Sandland et al. |
| 2005/0199714 A1 | 9/2005 | Brandt et al. |
| 2005/0210467 A1 | 9/2005 | Zimmer et al. |
| 2005/0216424 A1 | 9/2005 | Gandre et al. |
| 2005/0237330 A1 | 10/2005 | Stauffer et al. |
| 2005/0251446 A1 | 11/2005 | Jiang et al. |
| 2005/0268298 A1 | 12/2005 | Hunt et al. |
| 2005/0289540 A1 | 12/2005 | Nguyen et al. |
| 2005/0289648 A1 | 12/2005 | Grobman et al. |
| 2006/0050929 A1 | 3/2006 | Rast et al. |
| 2006/0069828 A1 | 3/2006 | Goldsmith |
| 2006/0095375 A1 | 5/2006 | Doyle et al. |
| 2006/0149665 A1 | 7/2006 | Weksler |
| 2006/0151598 A1 | 7/2006 | Chen et al. |
| 2006/0155862 A1 | 7/2006 | Kathi et al. |
| 2006/0178937 A1 | 8/2006 | Rau et al. |
| 2006/0259390 A1 | 11/2006 | Rosenberger |
| 2006/0271497 A1 | 11/2006 | Cullen et al. |
| 2007/0038997 A1 | 2/2007 | Grobman et al. |
| 2007/0079307 A1 | 4/2007 | Dhawan et al. |
| 2007/0088762 A1 | 4/2007 | Harris et al. |
| 2007/0089111 A1 | 4/2007 | Robinson et al. |
| 2007/0170247 A1 | 7/2007 | Friedman |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0229505 A1 | 10/2007 | Souza et al. |
| 2007/0234212 A1 | 10/2007 | de Souza et al. |
| 2007/0265961 A1 | 11/2007 | Shah et al. |
| 2008/0015988 A1 | 1/2008 | Brown et al. |
| 2008/0046349 A1 | 2/2008 | Elberg et al. |
| 2008/0077917 A1 | 3/2008 | Chen et al. |
| 2008/0215770 A1 | 9/2008 | Liu et al. |
| 2008/0222375 A1 | 9/2008 | Kotsovinos et al. |
| 2008/0227471 A1 | 9/2008 | Dankar et al. |
| 2008/0244546 A1 | 10/2008 | Schmelter et al. |
| 2008/0297433 A1 | 12/2008 | Heller et al. |

(56) References Cited

U.S. PATENT DOCUMENTS

| | | |
|---|---|---|
| 2009/0037333 A1 | 2/2009 | Flitcroft et al. |
| 2009/0037672 A1 | 2/2009 | Colbert et al. |
| 2009/0043702 A1 | 2/2009 | Bennett |
| 2009/0070260 A1 | 3/2009 | Flitcroft et al. |
| 2009/0083734 A1 | 3/2009 | Hotra |
| 2009/0083756 A1 | 3/2009 | Kim et al. |
| 2009/0094164 A1 | 4/2009 | Fontaine et al. |
| 2009/0098854 A1 | 4/2009 | Park et al. |
| 2009/0144197 A1 | 6/2009 | Hurry |
| 2009/0164382 A1 | 6/2009 | Sally |
| 2009/0172331 A1 | 7/2009 | Vembu et al. |
| 2009/0192935 A1 | 7/2009 | Griffin et al. |
| 2009/0204964 A1 | 8/2009 | Foley et al. |
| 2009/0240620 A1 | 9/2009 | Kendrick et al. |
| 2009/0313143 A1 | 12/2009 | Darensbourg et al. |
| 2010/0017325 A1 | 1/2010 | Scherpa et al. |
| 2010/0036770 A1 | 2/2010 | Fourez et al. |
| 2010/0058335 A1 | 3/2010 | Weber |
| 2010/0082445 A1 | 4/2010 | Hodge et al. |
| 2010/0082481 A1 | 4/2010 | Lin et al. |
| 2010/0094753 A1 | 4/2010 | Carlson et al. |
| 2010/0114739 A1 | 5/2010 | Johnston |
| 2010/0146074 A1 | 6/2010 | Srinivasan |
| 2010/0211445 A1 | 8/2010 | Bodington |
| 2010/0217916 A1 | 8/2010 | Gao et al. |
| 2010/0256982 A1 | 10/2010 | Bhagchandani et al. |
| 2010/0257040 A1 | 10/2010 | Hunt |
| 2010/0262537 A1 | 10/2010 | Park |
| 2010/0274718 A1 | 10/2010 | Ghosh et al. |
| 2010/0312636 A1 | 12/2010 | Coulter et al. |
| 2011/0006113 A1 | 1/2011 | Uchikura |
| 2011/0055047 A1 | 3/2011 | Fox |
| 2011/0087592 A1 | 4/2011 | van der Veen et al. |
| 2011/0106607 A1 | 5/2011 | Alfonso et al. |
| 2011/0127324 A1 | 6/2011 | Hirka et al. |
| 2011/0131133 A1 | 6/2011 | Hirka et al. |
| 2011/0145152 A1 | 6/2011 | McCown |
| 2011/0153402 A1 | 6/2011 | Craig |
| 2011/0161188 A1 | 6/2011 | Roberts |
| 2011/0179136 A1 | 7/2011 | Twitchell, Jr. |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0238510 A1 | 9/2011 | Rowen et al. |
| 2011/0252095 A1 | 10/2011 | Cypes et al. |
| 2011/0252278 A1 | 10/2011 | Kanno et al. |
| 2011/0282780 A1 | 11/2011 | French et al. |
| 2011/0288919 A1 | 11/2011 | Gross |
| 2011/0289001 A1 | 11/2011 | Bishop et al. |
| 2011/0320345 A1 | 12/2011 | Taveau et al. |
| 2012/0016956 A1 | 1/2012 | Twitchell |
| 2012/0066046 A1 | 3/2012 | Satyavolu et al. |
| 2012/0066681 A1 | 3/2012 | Levy et al. |
| 2012/0078786 A1 | 3/2012 | Anthony et al. |
| 2012/0109681 A1 | 5/2012 | Chapman et al. |
| 2012/0123924 A1 | 5/2012 | Rose et al. |
| 2012/0197773 A1 | 8/2012 | Grigg et al. |
| 2012/0233158 A1 | 9/2012 | Braginsky et al. |
| 2012/0259768 A1 | 10/2012 | Mukherjee |
| 2012/0267432 A1 | 10/2012 | Kuttuva |
| 2013/0024289 A1 | 1/2013 | Cueli et al. |
| 2013/0030934 A1 | 1/2013 | Bakshi et al. |
| 2013/0034221 A1 | 2/2013 | Aaron et al. |
| 2013/0040654 A1 | 2/2013 | Parish |
| 2013/0054458 A1 | 2/2013 | Jandris et al. |
| 2013/0110658 A1 | 5/2013 | Lyman et al. |
| 2013/0275303 A1 | 10/2013 | Fiore et al. |
| 2013/0275304 A1* | 10/2013 | Kranzley ............ G06Q 20/04 705/44 |
| 2013/0290181 A1 | 10/2013 | Milner et al. |
| 2013/0311357 A1 | 11/2013 | Kring |
| 2014/0006198 A1 | 1/2014 | Daly et al. |
| 2014/0012704 A1 | 1/2014 | Mizhen et al. |
| 2014/0040125 A1 | 2/2014 | Kunz et al. |
| 2014/0114776 A1 | 4/2014 | Solanki et al. |
| 2014/0129357 A1 | 5/2014 | Goodwin |
| 2016/0148185 A1 | 5/2016 | Andrews et al. |
| 2016/0196549 A1 | 7/2016 | Mizhen et al. |

FOREIGN PATENT DOCUMENTS

| | | |
|---|---|---|
| WO | 2013/015746 A2 | 1/2013 |
| WO | 2014/008471 A1 | 1/2014 |

OTHER PUBLICATIONS

U.S. Appl. No. 15/072,191 to Mizhen et al. filed Mar. 16, 2016.
U.S. Appl. No. 13/545,702 to Michel Weksler filed Jul. 10, 2012.
U.S. Appl. No. 13/728,619 to Kunz et al. filed Dec. 27, 2012.
U.S. Appl. No. 13/784,790 to Andrews et al. filed Mar. 4, 2013.
U.S. Appl. No. 14/743,566 to Andrews et al. filed Jun. 18, 2015.
U.S. Appl. No. 13/784,808 to Blandina et al. filed Mar. 4, 2013.
Allen, "U.S. Office Action issued in copending U.S. Appl. No. 13/542,303, filed Jul. 5, 2012", dated Oct. 9, 2014, 16 pages.
Allen, "U.S. Office Action issued in copending U.S. Appl. No. 13/542,303, filed Jul. 5, 2012", dated Jul. 20, 2015, 7 pages.
Allen, "U.S. Office Action issued in copending U.S. Appl. No. 13/542,303, filed Jul. 5, 2012", dated Mar. 2, 2015, 8 pages.
Allen, "U.S. Office Action issued in copending U.S. Appl. No. 13/542,303, filed Jul. 5, 2012", dated Nov. 17, 2015, 9 pages.
Campen, "U.S. Office Action issued in copending U.S. Appl. No. 13/545,702, filed Jul. 10, 2012", dated Nov. 20, 2014, 10 pages.
Campen, "U.S. Office Action issued in copending U.S. Appl. No. 13/545,702, filed Jul. 10, 2012", dated Jun. 11, 2015, 11 pages.
Campen, "U.S. Office Action issued in copending U.S. Appl. No. 13/545,702, filed Jul. 10, 2012", dated Jun. 17, 2013, 14 pages.
Campen, "U.S. Office Action issued in copending U.S. Appl. No. 13/545,702, filed Jul. 10, 2012", dated Feb. 24, 2014, 15 pages.
Campen, "U.S. Office Action issued in copending U.S. Appl. No. 13/545,702, filed Jul. 10, 2012", dated Feb. 17, 2016, 18 pages.
Campen, "U.S. Office Action issued in copending U.S. Appl. No. 13/545,702, filed Jul. 10, 2012", dated Jul. 10, 2014, 9 pages.
Campen, "U.S. Office Action issued in copending U.S. Appl. No. 13/545,702, filed Jul. 10, 2012", dated Mar. 6, 2015, 9 pages.
Campen, "U.S. Office Action issued in copending U.S. Appl. No. 13/545,702, filed Jul. 10, 2012", dated Jul. 7, 2016, 19 pages.
Campen, "U.S. Office Action issued in copending U.S. Appl. No. 13/545,702, filed Jul. 10, 2012", dated Nov. 15, 2016, 19 pages.
Campen, "U.S. Office Action issued in copending U.S. Appl. No. 13/545,702, filed Jul. 10, 2012", dated Apr. 27, 2017, 21 pages.
Colbert, "U.S. Office Action issued in copending U.S. Appl. No. 13/759,003, filed Feb. 4, 2013", dated Jun. 6, 2013, 24 pages.
Felten, "U.S. Office Action issued in copending U.S. Appl. No. 13/728,619, filed Dec. 27, 2012", dated Dec. 19, 2014, 11 pages.
Felten, "U.S. Office Action issued in copending U.S. Appl. No. 13/728,619, filed Dec. 27, 2012", dated Jul. 10, 2014, 11 pages.
Felten, "U.S. Office Action issued in copending U.S. Appl. No. 13/728,619, filed Dec. 27, 2012", dated Mar. 24, 2017, 13 pages.
Felten, "U.S. Office Action issued in copending U.S. Appl. No. 13/728,619, filed Dec. 27, 2012", dated Jul. 9, 2015, 16 pages.
Felten, "U.S. Office Action issued in copending U.S. Appl. No. 13/728,619, filed Dec. 27, 2012", dated Jan. 30, 2014, 8 pages.
Felten, "U.S. Office Action issued in copending U.S. Appl. No. 13/728,619, filed Dec. 27, 2012", dated Aug. 30, 2016, 9 pages.
Hirka, et al., "Multiple Account Advanced Payment Card and Method of Routing Card Transactions", U.S. Appl. No. 11/846,842, filed Aug. 29, 2007, 29 pages.
Johnson, "U.S. Office Action issued in copending U.S. Appl. No. 13/717,295, filed Dec. 17, 2012", dated Feb. 28, 2013, 13 pages.
Lendino, "How to Remotely Disable Your Lost or Stolen Phone", PCMag.co, Apr. 12, 2012, 2 pages.
Nguyen, "U.S. Office Action issued in copending U.S. Appl. No. 13/784,808, filed Mar. 4, 2013", dated Jul. 15, 2013, 20 pages.
Nguyen, "U.S. Office Action issued in copending U.S. Appl. No. 13/784,808, filed Mar. 4, 2013", dated Mar. 4, 2014, 23 pages.
Nguyen, "U.S. Office Action issued in copending U.S. Appl. No. 13/784,808, filed Mar. 4, 2013", dated Nov. 4, 2014, 30 pages.

(56) References Cited

OTHER PUBLICATIONS

Nguyen, "U.S. Office Action issued in copending U.S. Appl. No. 13/784,808, filed Mar. 4, 2013", dated Oct. 27, 2015, 6 pages.
Nguyen, "U.S. Office Action issued in copending U.S. Appl. No. 13/784,808, filed Mar. 4, 2013", dated May 29, 2015, 7 pages.
Nguyen, "U.S. Office Action issued in copending U.S. Appl. No. 13/784,808, filed Mar. 4, 2013", dated May 25, 2016, 9 pages.
Nickitas-Etienne, "International Preliminary Report on Patentability issued in International Application No. PCT/US2013/049446", dated Jan. 15, 2015, 7 pages.
Niquette, "U.S. Office Action issued in copending U.S. Appl. No. 13/784,790, filed Mar. 4, 2013", dated Jun. 13, 2013, 11 pages.
Niquette, "U.S. Office Action issued in copending U.S. Appl. No. 13/784,790, filed Mar. 4, 2013", dated Nov. 5, 2013, 20 pages.
Niquette, "U.S. Office Action issued in copending U.S. Appl. No. 14/743,566, filed Jun. 18, 2015", dated Oct. 21, 2016, 6 pages.
Oh, "International Search Report and Written Opinion issued in International Application No. PCT/US2013/049446", dated Oct. 22, 2013, 10 pages.
Premnath, "Australian Office Action issued in Australian Application No. 2013207643", dated Oct. 14, 2013, 3 pages.
Quittner, "Pay Pal Seeks to Cut Out Card Companies with New Plastic", Oct. 18, 2011, 2 pages.
Shaikh, "U.S. Office Action issued in copending U.S. Appl. No. 13/802,705, filed Mar. 13, 2013", dated Jul. 18, 2013, 11 pages.
Ziegle, "U.S. Office Action issued in copending U.S. Appl. No. 13/658,783, filed Oct. 23, 2012", dated Jan. 20, 2015, 14 pages.
Ziegle, "U.S. Office Action issued in copending U.S. Appl. No. 13/658,783, filed Oct. 23, 2012", dated Mar. 5, 2013, 14 pages.
Ziegle, "U.S. Office Action issued in copending U.S. Appl. No. 13/658,783, filed Oct. 23, 2012", dated May 8, 2015, 14 pages.
Ziegle, "U.S. Office Action issued in copending U.S. Appl. No. 13/658,783, filed Oct. 23, 2012", dated Jul. 11, 2013, 16 pages.
Allen, "U.S. Office Action issued in copending U.S. Appl. No. 15/072,191, filed Mar. 16, 2016", dated Apr. 19, 2018, 10 pages.

* cited by examiner

SELECTING A PREFERRED PAYMENT INSTRUMENT

REFERENCE TO RELATED APPLICATIONS

This patent application is a continuation of and claims priority to U.S. patent application Ser. No. 14/743,566, filed on Jun. 18, 2015 and entitled "Selecting A Preferred Payment Instrument," which is a continuation of and claims priority to U.S. patent application Ser. No. 13/784,790, filed on Mar. 4, 2013 and entitled "Selecting A Preferred Payment Instrument." The entire contents of the above-identified priority applications are hereby fully incorporated herein by reference.

TECHNICAL FIELD

The present disclosure relates generally to proxy card payment transactions, and more particularly to selecting a preferred payment instrument in a proxy card payment transaction.

BACKGROUND

Payments can be conducted by a mobile device of a user with a point of sale terminal of a merchant. The mobile device can communicate with the terminal via near field communication ("NFC"), BLUETOOTH, barcode, Wi-Fi, infrared, or any other suitable communication technology. The mobile device can host a payment application, such as a digital wallet application module, that can complete a transaction with the terminal.

The point of sale terminal can obtain the payment information from the mobile device and transmit transaction details to the mobile device. The point of sale terminal can submit the transaction details to the card network to receive payment from the card issuer. A digital wallet application module on the mobile device can support multiple financial accounts and the cards associated with the account. The user can conduct a transaction with different financial instruments, such as credit cards, debit cards, stored value cards, or other payment cards, supported by the application.

Currently, when the user employs a proxy card to conduct the transaction, the user must select a backing payment instrument at the time of purchase with which to conduct the transaction. That is, at the time of purchase, the user must select a backing payment instrument and apply it to the purchase. Alternatively, the user may assign a payment instrument for all transactions until the assignment is changed or provide rules allowing a payment processing system to make the selection. Some payment instruments may be better suited for a particular transaction than other cards. For example, some payment instruments provide better rewards or provide better terms for transactions with certain merchant categories.

Conventional proxy card systems do not utilize user selections of payment instruments and other related transaction details to predict the preferred payment instrument and provide the predicted payment instrument to the user.

SUMMARY

One aspect of the example embodiments described herein provides a computer-implemented method to select payment instruments for proxy card transactions is described. The method comprises associating, using one or more computer devices, a plurality of financial accounts with a user proxy account, the user proxy account being maintained by the one or more computing devices; establishing a model for the user account based on configuration data received from a user associated with the user proxy card account, the model comprising identification of a particular financial account to use as a backing instrument for a transaction using the user proxy account; receiving data associated with a pending transaction with a merchant, the transaction being conducted between a merchant computing device and the user, the data comprising information regarding the pending transaction and information provided to the merchant computing device to identify the user proxy account; identifying a financial account from among the plurality of financial accounts to use as a backing instrument for the pending transaction based at least in part on a comparison of the model with the pending transaction data; receiving an input of a selection of an alternate financial account to use instead of the identified financial account as the backing instrument for the pending transaction; logging the data associated with the pending transaction and the selected, alternate financial account selected; modifying the model for the user account based on the selection of the alternate financial account and the data associated with the pending transaction; and utilizing the modified model for the user account in a subsequent selection of a financial account for a backing instrument for a subsequent transaction involving the user proxy account.

A computer program product that is installed on a server located in a payment processing system to select payment instruments for proxy card transactions. The computer program product includes a non-transitory computer-readable storage device having computer-readable program instructions stored therein. The computer-readable program instructions include computer program instructions for associating a plurality of financial accounts with a user proxy account, the user proxy account being maintained by the one or more computing devices; establishing a model for the user account based on configuration data received from a user associated with the user proxy card account, the model comprising identification of a particular financial account to use as a backing instrument for a transaction using the user proxy account; receiving data associated with a pending transaction with a merchant, the transaction being conducted between a merchant computing device and the user, the data comprising information regarding the pending transaction and information provided to the merchant computing device to identify the user proxy account; identifying a financial account from among the plurality of financial accounts to use as a backing instrument for the pending transaction based at least in part on a comparison of the model with the pending transaction data; receiving an input of a selection of an alternate financial account to use instead of the identified financial account as the backing instrument for the pending transaction; logging the data associated with the pending transaction and the selected, alternate financial account selected; modifying the model for the user account based on the selection of the alternate financial account and the data associated with the pending transaction; and utilizing the modified model for the user account in a subsequent selection of a financial account for a backing instrument for a subsequent transaction involving the user proxy account.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

In one example embodiment, payment processing systems enable users to utilize a single card to access multiple financial accounts maintained by multiple issuers. The user receives a proxy card from the payment processing system and either creates a new proxy card account with the payment processing system or associates the proxy card with the user's digital wallet account already maintained by the payment processing system.

The user then associates one or more financial card accounts with the proxy account. For example, the user can associate with the user's proxy card account multiple debit/credit cards maintained by multiple issuers (including the payment processing system operating as an issuer), stored value cards (for example, gift cards, prepaid cards, re-loadable transaction cards, exchange cards, and other forms of non-credit based value cards), loyalty cards or other store rewards cards, value added service accounts (for example, coupons, vouchers for prepaid offers, redemption offers, and other forms of offers), peer-to-peer transaction accounts, bank accounts and/or other forms of financial accounts.

The proxy card can be represented on a digital wallet application module or other payment application on a user computing device, such as a mobile phone. For example, the user proxy card account information, such as a proxy card account identifier, can be stored on the user computing device for use in a payment transaction by the digital wallet application module or other application. The user can communicate the proxy card account identifier and other transaction data to a merchant point of sale ("POS") terminal using the user computing device via near field communication ("NFC"), barcode, BLUETOOTH, Wi-Fi communication, infrared, or other suitable communication technology. Alternatively, the proxy card can be represented as a physical payment card comprising a magnetic stripe or other machine-readable portion comprising the user's proxy card account identifier and other payment information. In this case, the user scans or swipes the proxy card at the merchant POS terminal to communicate the proxy card account identifier and other transaction data to the merchant POS terminal. Additionally or alternatively, the proxy card can be represented as any other suitable payment instrument, such as an RFID device or a smartcard. Additionally or alternatively, the payment instrument can be a digital wallet application module or other payment instrument on a user computing device for conducting online transactions, such as a mobile or desktop computer, laptop computer, or a television with one or more processors embedded therein and/or coupled thereto.

The merchant system creates a payment request for the transaction using the proxy card information and forwards the payment request to an acquirer, which forwards the payment request to a card network. The card network forwards the payment request to the payment processing system, which functions as the issuer for the payment request.

The payment processing system reads proxy card account information from the payment request and accesses the user's account associated with the proxy card. If the payment processing system is the issuer of the particular financial account selected as the backing instrument for the proxy card transaction, the payment processing system will approve or decline the transaction.

If another issuer maintains the particular financial account to be used as the backing instrument for the transaction, the payment processing system will generate and send a new payment request for the transaction to the other issuer via the card network (or via different card network). The payment processing system receives an authorization message from the other issuer via the card network if the transaction is approved.

The payment processing system forwards an authorization to the acquirer through the card network, which forwards the authorization to the merchant system. The authorization is based on the payment processing system's determination as the issuer to authorize the transaction or the authorization received from the other issuer.

The merchant system then approves the transaction, based on the authorization received from the payment processing system.

The user sets rules or preferences specifying which financial account will be accessed and used as the backing instrument when a proxy card transaction is attempted. The user can then add, delete, or change the default payment rules associated with the user's proxy card account. The user can change these default static rules, create new rules, or delete a rule. In an example embodiment, the user can access the proxy card account and modify the rules at any time, including a time immediately before a payment transaction is initiated. In an example embodiment, the user can access the proxy card account using a mobile device application, such as a digital wallet application module executing on the user's mobile computing device. The rules can be maintained on the digital wallet application module, on the user device, or on a server at the payment processing system. Throughout the specification, any of the functions described as being performed by the digital wallet application module or the user computing device can be performed by the payment processing system. Alternatively, any functions described as being performed by the payment processing system can be performed by the digital wallet application module or the user computing device.

When a user enters a merchant system location to conduct a proxy card transaction, the digital wallet application module on the user computing device can note the location of the user and other environmental factors, such as the time of day or the day of week. The digital wallet application module may access information regarding the environment of the user computing device continuously, when the digital wallet application module is opened on the user computing device, when the user indicates that a transaction is imminent, after a transaction is initiated, when the user computing device enters the location of a merchant system, or at any other suitable time.

The user computing device can determine the geo-location of the merchant system based on a location application on the user computing device. For example, the user computing device can use global positioning system capabilities of the user computing device or other location determining hardware or software to determine the geo-location of the merchant system. Alternatively, the user can manually identify the location by "checking in" to the location, such as on a social network site or in any suitable manner. A wireless connection between the user computing device and the merchant system point of sale system may alternatively provide location information to the user computing device.

The user selects a product for purchase. Throughout the specification, the term "product" can refer to any tangible or intangible product or service.

The user opens or otherwise initiates the digital wallet application module to conduct the transaction with the merchant system by presenting proxy card account information to the merchant system's POS terminal. The digital wallet application module displays a selected backing payment instrument to be used in the transaction with the merchant system when the user presents the proxy card of the user to the merchant system. The digital wallet application module can receive the card selection for the backing instrument from the payment processing system or the digital wallet application module may make the selection. The backing instrument may be selected based on any rules or preferences received from the user at the time of account configuration, at the time of associating payment instruments, or at any suitable time thereafter. In an example rule, the user may have input a preference that a department store utilize a card associated with the department store as the backing instrument whenever the user is at a location of the department store. In another example, a user may have input a preference to utilize a travel rewards card as the backing instrument whenever the user makes a travel related purchase.

If a user has not provided a rule or a preference that applies to a particular transaction, the payment processing system may recommend a backing instrument to the user based on the selections of other users. The payment processing system can access transaction histories of other users that have multiple backing instruments associated with the account of each user and determine the backing instrument selected for related transactions by each user. The payment processing system can rank the identities of backing instruments selected by other users of the payment processing system. The payment processing system can identify which of the backing instruments that is associated with the user is most often selected by other users. The payment processing system can recommend that the user select the identified backing instrument for use in the transaction with the merchant system.

In certain example embodiments, the user does not provide any initial rules or preferences to the payment processing system. The payment processing system or the user can select a default backing instrument and employ the default backing instrument for all transactions unless the user selects an alternative backing instrument.

The digital wallet application module can indicate to the user that a backing instrument selected by the digital wallet application module or the payment processing system will be utilized for a transaction that may be forthcoming while at the current location of the user. The indication can be a display of the backing instrument by the digital wallet application module on the user computing device when the user accesses the proxy card account on the digital wallet application module. Any suitable indication can be employed to alert the user to the selected backing instrument.

In certain example embodiments, the user is not provided with an indication of the backing instrument selected by the digital wallet application module for use in the transaction with the merchant system. The payment processing system can make the backing instrument selection and conduct the transaction with the selected backing instrument.

The user can conduct the transaction with the selected backing instrument or the user can indicate to the digital wallet application module that an alternate backing instrument is preferred. For example, the user can access a list of backing instruments on the user computing devise. The list of backing instruments can be presented on the digital wallet application module and the user can select a backing instrument that is different from the backing instrument selected by the payment processing system. Any other manner of choosing and selecting an alternate backing instrument can be employed by the user and the digital wallet application module. Then, the user can conduct the proxy card transaction with the merchant system using the alternate backing instrument as the backing instrument.

The digital wallet application module can log the circumstances of the transaction and the alternate backing instrument selected by the user. The circumstances can be stored in the user account on the digital wallet application module and/or the payment processing system. The circumstances can include any information associated with the transaction, such as the location of the merchant system, the identity of the merchant system, the category of the merchant system, the time of day, the day of the week, the season of the year, the environmental conditions, or an other suitable information.

The stored information can be included in a model of user preferences to be utilized in future card selections and recommendations. As the model gathers more useful information regarding the selections and preferences of the user, the payment processing system can make better backing instrument selections for the user. For example, the model may determine that while the user indicated a preference to use a particular credit card associated with an employer as the backing instrument, the user may prefer to use a personal credit card on the weekend. In another example, the model may determine that while the user indicated a preference to use a travel rewards credit card as the backing instrument for most restaurant purchases, the user prefers a personal debit card at coffee shops. In another example, the model may determine that the user prefers to use a business credit card as the backing instrument for all expenses when traveling to a particular city, such as the location of the corporate office of the user's employer. Any other suitable determinations may be predicted by the model based on the information logged with user transactions.

The model can determine from the user actions that a rule should be ignored or modified in certain circumstances. The payment processing system can use the model for selecting a backing instrument during future transactions. In an example, a user may have established a rule that selects a particular backing instrument for all airline flights. However, in the previous two transactions with a particular airline, the user has changed the backing instrument to an alternate backing instrument. The model can recognize a subsequent pending transaction with the particular airline, and the payment processing system can select the alternate backing instrument instead of the backing instrument the rule would have required.

Alternatively, the payment processing system can direct the digital wallet application module to provide the alternate backing instrument as an option to the user. For example, the digital wallet application module can indicate which backing instrument would be selected by the rules, but offer the user an optional backing instrument based on history of the user with the particular airline.

In an alternate embodiment, the features of the invention can be utilized in a transaction with the merchant system that is initiated by using a magnetic stripe card, RFID, smartcard, or any other physical payment instrument. The merchant system can initiate the transaction after receiving the user account information from the magnetic stripe card. The payment processing system or the merchant system can transmit a request to the user computing device to enter a backing instrument or a notice of the pre-selected backing instrument. The user can acknowledge the selection, make a new selection, or take no action.

In an alternate embodiment, all of the processes can be performed in an online transaction. The user computing device may attempt a transaction with an online merchant system. The merchant system can submit the transaction and the merchant system details. The payment processing system can determine the conditions of the transaction, such as the identity of the merchant system, the category of the merchant system, the time of day, the day of the week, the season of the year, or other suitable information. The backing instrument selection and any alternate backing instrument selection by the user can be performed in a similar manner to the example embodiments described herein.

The functionality of the example embodiments will be explained in more detail in the following description, read in conjunction with the figures illustrating the program flow.

Example System Architectures

Turning now to the drawings, in which like numerals represent like (but not necessarily identical) elements throughout the figures, example embodiments are described in detail.

Figure 1:
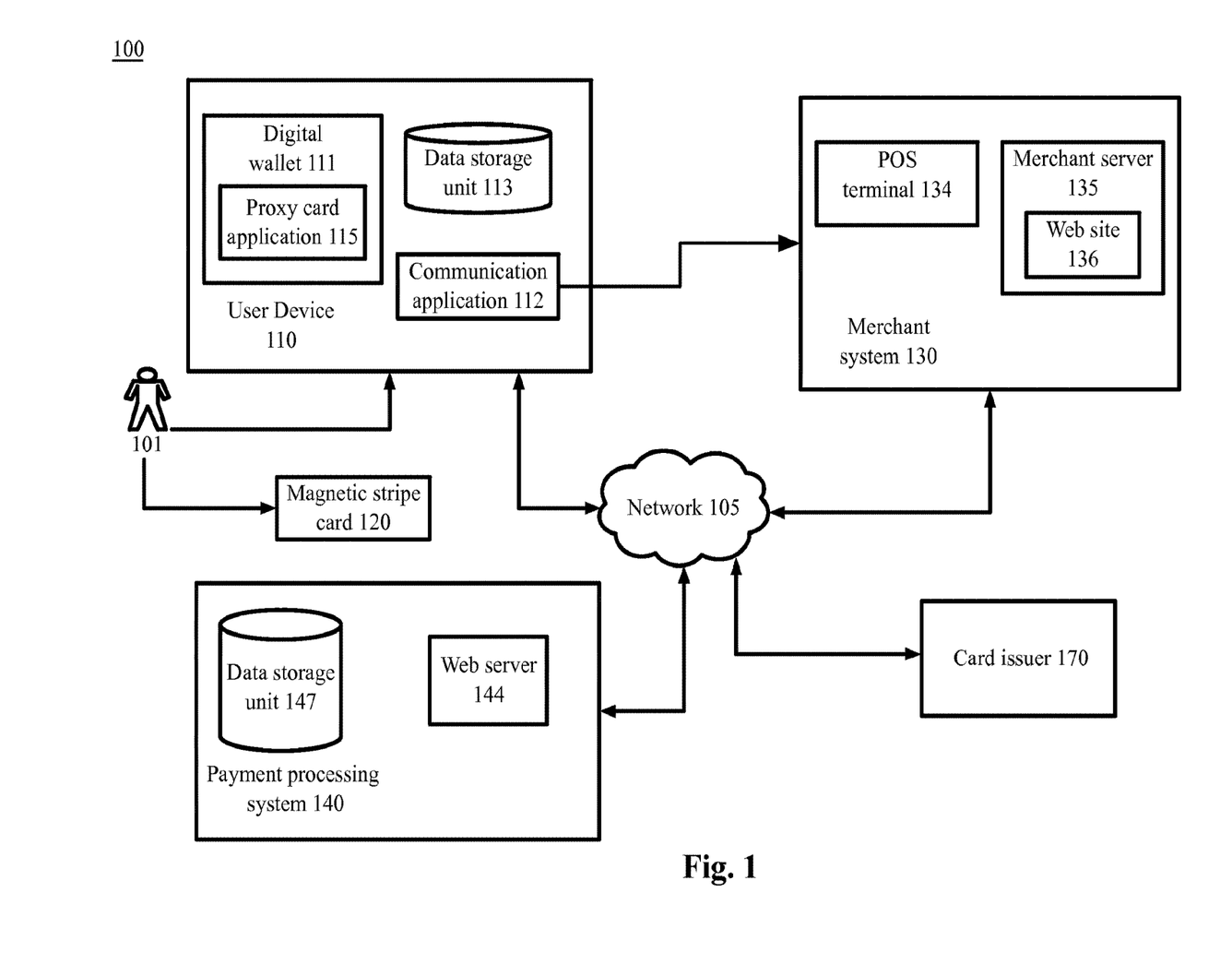
FIG. 1 is a block diagram depicting a system for a payment processing system to select a preferred card, in accordance with certain example embodiments.

FIG. 1 is a block diagram depicting a system for selecting backing instruments, in accordance with certain example embodiments. As depicted in FIG. 1, the system 100 includes network devices 110, 130, 140, and 170 that are configured to communicate with one another via one or more networks 105.

Each network 105 includes a wired or wireless telecommunication means by which network devices (including devices 110, 130, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 130, 140, and 170 includes a device having a communication module capable of transmitting and receiving data over the network 105. For example, each network device 110, 130, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, 140, and 170 are operated by end-users or consumers, merchant system operators, payment processing system operators, and card issuer operators, respectively.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 130, and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including the point of sale terminal 134 of the merchant system 130, the merchant server 135 of the merchant system 130, and the web server 144 of the payment processing system 140.

The user network device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 can include a proxy card application 115. The proxy card application 115 can interact with the communication application 112 or be embodied as a companion application of the communication application 112 and execute within the communication application 112. The proxy card application 115 may further be embodied as a companion application of the digital wallet application module 111 and execute within the digital wallet application module 111. The proxy card application 115 may employ a software interface for configuration that may open in the digital wallet application module 111 or may open in the web browser application 112. Alternatively, the proxy card application 115 may be execute on the user device 110 independent of the digital wallet application module 111 and the communication application 112.

The proxy card application 115 is operable to allow a user 101 to configure a proxy card account on the user device 110 and the payment processing system 140. The proxy card application 115 can allow the user 101 to set rules, confirm transactions, select preferred cards for a transaction, receive notice of a card selection, and provide other suitable services. Any functions of the proxy card application 115 can be performed by the digital wallet application module 111. Any function of the digital wallet application 111 can be performed by the proxy card application 115.

The user device 110 also includes a data storage unit 113 accessible by the digital wallet application module 111, the proxy card application 115, and the communication application 112. The example data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

The user 101 may use the user device 110 or other network device to register the proxy card application 115 and/or access the payment processing system account of the user 101. The user device 110 may comprise appropriate technology that includes or is coupled to a web server.

The proxy card or other payment instrument can be represented as a magnetic strip card 120. The magnetic stripe card 120 can be a physical payment card comprising a magnetic stripe or other machine-readable portion comprising the user's proxy card account identifier and other payment information. In this case, the user scans or swipes the magnetic stripe card 120 at the merchant POS terminal 134 to communicate the proxy card account identifier and other transaction data to the POS terminal 134. Additionally or alternatively, the magnetic stripe card 120 can be represented as any other suitable payment instrument, such as an RFID device or a smartcard.

The payment processing system 140 includes a data storage unit 147 accessible by the web server 144. The example data storage unit 147 can include one or more tangible computer-readable storage devices. The payment processing system 140 is operable to conduct wireless payments between a user 101 and a merchant system 130. The payment processing system 140 is further operable to maintain a database to store transactions of the merchant system 130 and the user 101, recommend automatic payment recipients, and other suitable functions.

The user 101 can use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. The card issuer 170 may be the issuer of the financial account being registered. For example, the card issuer, may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144.

The user 101 also may use the web server 144 to define payment rules. The creation of a backing instrument model for a user is discussed in more detail hereinafter with reference to the methods described in FIG. 2.

The merchant system 130 may use a web server 135 to view, download, upload, create offers, sell products online, or otherwise access the payment processing system 140 via a website 136 and a communication network 105. The merchant system 130 represents an entity that offers products for the user 101 to purchase or use. The merchant system 130 includes a POS terminal 134. The POS terminal 134 may be operated by a salesperson that enters the purchase data into the POS terminal 134 to complete the purchase transaction. The merchant system 130 may be a physical location or an online merchant.

The user 101 may request a purchase from the merchant system 130. In an example embodiment, the purchase is initiated by a wireless "tap" of the mobile device 110 with the POS terminal 134. In an alternative example embodiment, the purchase is initiated when the user 101 enters an account identification number at the POS terminal 134 or in the mobile device 110. In another alternative example embodiment, the purchase is initiated online with the merchant server 135. The purchase may be initiated via the merchant website (not pictured). In yet another alternative example embodiment, the purchase is initiated by use of a permanent/temporary virtual/physical token, QR code, bar code, or other suitable machine-readable medium captured by the POS terminal 134. The merchant's POS terminal 134 interacts with an acquirer, the card network, the payment processing system 140, and the issuer.

Example Processes

Figure 2:
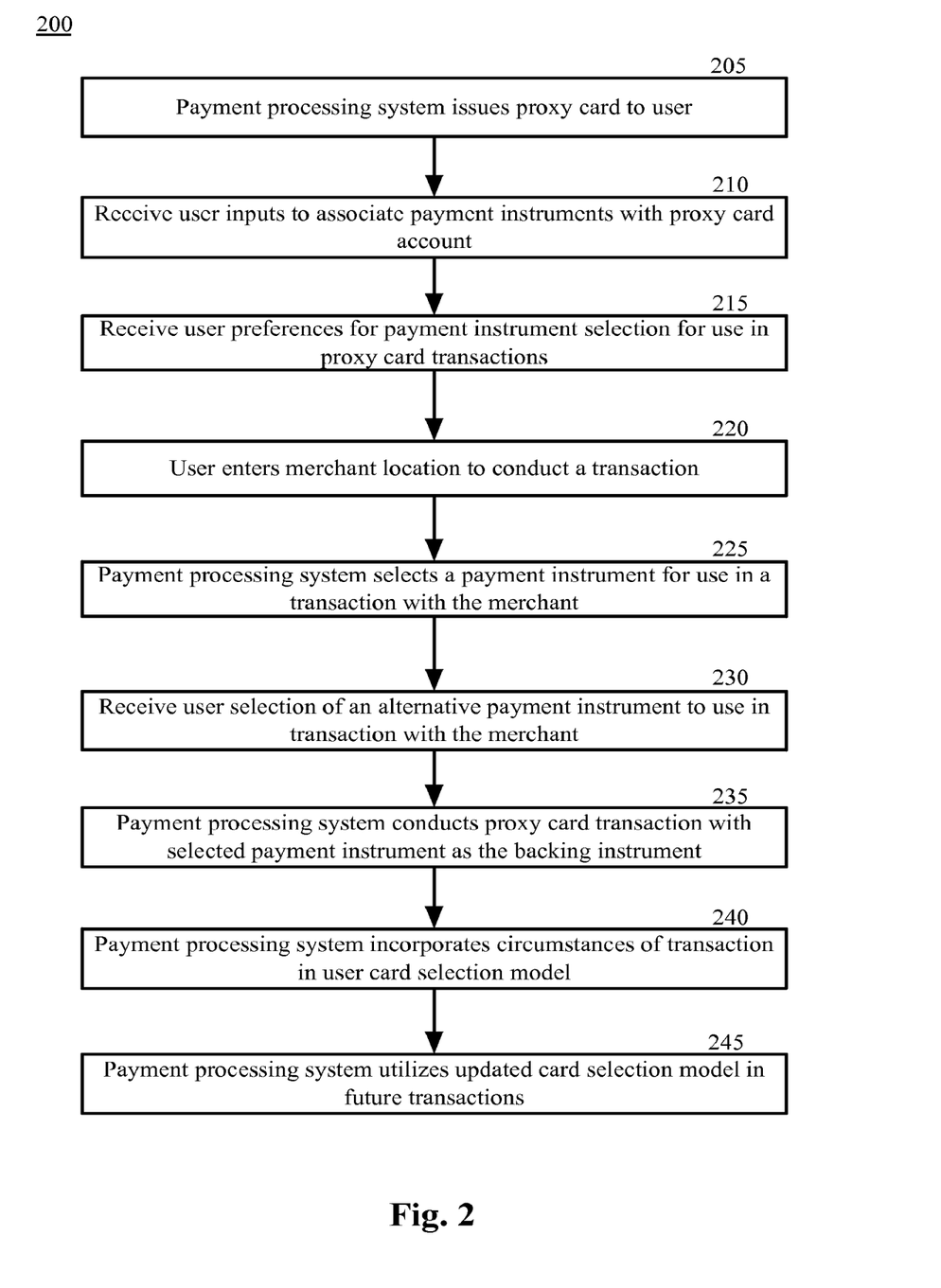
FIG. 2 is a block flow diagram depicting a method for selecting a preferred card in a proxy card payment transaction, in accordance with certain example embodiments.

The example methods illustrated in FIG. 2 are described hereinafter with respect to the components of the example operating environment 100. The example methods of FIG. 2 may also be performed with other systems and in other environments.

FIG. 2 is a block flow diagram depicting a method 200 for selecting a preferred card in a proxy card payment transaction, in accordance with certain example embodiments.

With reference to FIGS. 1 and 2, in block 205, the payment processing system 140 issues a proxy card account to the user 101. In an example embodiment, the user 101 requests a proxy card using a web server 144, and the proxy card is mailed to the user 101. The user 101 may be issued an account number to be used for transactions via the Internet before or after a physical card is received. In an alternative example embodiment, the payment processing system 140 mails an inactivated proxy card to the user 101. The proxy card is then activated by the user 101 before use. In an alternative example embodiment, a physical proxy card is not issued. The proxy card account information can be stored in the user device 110 and is used to make a payment via a NFC, Bluetooth, barcode, Wi-Fi, or other form of wireless tap of the user device 110 with the point of sale ("POS") terminal 134. In an alternative example embodiment, the purchase is initiated when the user 101 enters an account identification number at the POS terminal 134 or in the user device 110. The account identification number may be the proxy card account number or a different number that links the payment transaction to the proxy card account. In yet another alternative example embodiment, a purchase is initiated by use of a permanent/temporary virtual/physical token QR code, bar code, or other suitable machine-readable medium that is read by the POS terminal 134. In these cases, the POS terminal 134 may comprise a scanner, camera, or other reading device that captures the proxy account information, such as a bar code or QR reader or other suitable reading device. The proxy account information may be printed in paper or other form.

The user 101 creates a new payment processing system 140 account or links the proxy card to an existing account on the payment processing system 140. The payment processing system 140 also may create or update an account on a proxy card application 115 on the user device 110 or on a digital wallet application module 111 on the user device 110. The digital wallet application module 111 may have proxy card application 115 operating on the digital wallet application module 111, or the proxy card application 115 may operate independently of the digital wallet application module 111. All functions throughout the specification described as being performed by the digital wallet application module 111 may be performed by the proxy card application 115.

In block 210, the user 101 activates the proxy card and associates one or more financial instrument accounts (for example, debit cards, credit cards, gift cards/stored value cards, loyalty cards/reward cards, peer-to-peer payment accounts, coupons, prepaid or other offers, and other accounts used to make a purchase or redeem value added services) with the proxy card account. In an example embodiment, the user 101 associates multiple financial instrument accounts with the proxy card account. The user 101 may perform this block by inputting identifying information for each financial payment instrument account. The user 101 may input the identifying information for each financial payment instrument account into the digital wallet account module 111, into a user interface of the payment processing system server 144, or any other suitable user interface.

In an example embodiment, one or more financial instrument account(s) are maintained by the payment processing system 140 and other payment instrument systems. In an alternative example embodiment, the payment processing system 140 maintains one or more of the financial instrument accounts and acts as the issuer for that financial instrument account. In another example embodiment, the financial instrument accounts are maintained by more than one payment instrument systems, including the payment processing system 140. Additionally or alternatively, one or more of the financial instrument accounts are issued by the card issuer 170.

In block 215, the user 101 establishes rules for selecting a payment instrument in a transaction. The user 101 sets rules or preferences specifying which financial account will be accessed and used as the backing instrument when a proxy card transaction is attempted. The user 101 can then add, delete, or change the default payment rules associated with the user's proxy card account. The user 101 can change these default static rules, create new rules, or delete a rule.

In an example embodiment, the user 101 can access the proxy card account and modify the rules at any time, including a time immediately before a payment transaction is initiated. In an example embodiment, the user 101 can access the proxy card account using a mobile device application, such as a digital wallet application module 111 executing on the user's mobile computing device 110. The rules can be maintained on the digital wallet application module 111, on the user device 110, or on a server at the payment processing system 140.

Any of the functions described as being performed by the digital wallet application module 111 or the user computing device 110 can be performed by the payment processing system 140. Alternatively, any functions described as being performed by the payment processing system 140 can be performed by the digital wallet application module 111 or the user computing device 110.

In block 220, a user 101 enters a merchant system 130 location to conduct a transaction. The merchant system 130 can be a store, restaurant, amusement park, gas station, airline, hotel, vendor, contractor or any suitable merchant system 130 that offers products for sale. The term "product" represents any tangible or intangible products, as well as services.

When a user 101 enters a merchant location to conduct a proxy card transaction, the digital wallet application module 111 on the user computing device 110 can note the location of the user 101 and other environmental factors, such as the time of day or the day of week. The digital wallet application module 111 may access information regarding the environment of the user computing device 110 continuously, when the digital wallet application module 111 is opened on the user computing device 110, when the user 101 indicates that a transaction is imminent, after a transaction is initiated, when the user computing device 110 enters the location of a merchant system 130, or at any other suitable time.

The user computing device 110 can determine the geo-location of the merchant system 130 based on a location application on the user computing device 110. For example, the user computing device 110 can use global positioning system capabilities of the user computing device 110 or other location determining hardware or software to determine the geo-location of the merchant system 130. Alternatively, the user 101 can manually identify the location by "checking in" to the location, such as on a social network site or in any suitable manner. A wireless connection between the user computing device 110 and the merchant system 130 point of sale ("POS") terminal 134 may alternatively provide location information to the user computing device 110.

In block 225, the payment processing system 140 selects a payment instrument for use a transaction with the merchant system 130. The user 101 opens or otherwise initiates the digital wallet application module 111 to conduct the transaction with the merchant system 130 by presenting proxy card account information to the merchant's POS terminal 134. The digital wallet application module 111 displays a selected backing payment instrument to be used in the transaction with the merchant system 130 when the user 101 presents the proxy card of the user 101 to the merchant system 130. The digital wallet application module 111 can receive the card selection for the backing instrument from the payment processing system 140 or the digital wallet application module 111 may make the selection. The backing instrument may be selected based on any rules or preferences received from the user 101 at the time of account configuration, at the time of associating payment instruments, or at any suitable time thereafter.

In an example rule, the user 101 may input a preference that a department store utilize a card associated with the department store as the backing instrument whenever the user 101 is at a location of the department store. In another example, a user 101 may input a preference to utilize a travel rewards card as the backing instrument whenever the user 101 makes a travel related purchase. In another example, the user 101 may input a preference to use a card associated with a fuel provider for all purchases at gas stations. In another example, the user 101 may input a preference to use a particular card for any transaction being conducted in a foreign currency. Any other suitable rule can be established by the user 101 and utilized by the payment processing system 140 and the digital wallet application module 111.

If a user 101 has not provided a rule or a preference that applies to a particular transaction, the payment processing system 140 may recommend a backing instrument to the user 101 based on the selections of other users. The payment processing system 140 can access transaction histories of other users that have multiple backing instruments associated with the account of each user and determine the backing instrument selected for related transactions by each user. The payment processing system 140 can rank the identities of backing instruments selected by other users of the payment processing system 140. The payment processing system 140 can identify which of the backing instruments that is associated with the user is most often selected by other users. The payment processing system 140 can recommend that the user 101 select the identified backing instrument for use in the transaction with the merchant system 130.

In certain example embodiments, the user 101 does not provide any initial rules or preferences to the payment processing system 140. The payment processing system 140 or the user 101 can select a default backing instrument and employ the default backing instrument for all transactions unless the user 101 selects an alternative backing instrument.

The digital wallet application module 111 can indicate to the user 101 that a backing instrument selected by the digital wallet application module 111 or the payment processing system 140 will be utilized for a transaction that may be forthcoming while at the current location of the user 101. The indication can be a display of the backing instrument by the digital wallet application module 111 on the user computing device 110 when the user accesses the proxy card account on the digital wallet application module 111. Any suitable indication can be employed to alert the user 101 to the selected backing instrument.

In certain example embodiments, the user 101 is not provided with an indication of the backing instrument selected by the digital wallet application module 111 for use in the transaction with the merchant system 130. The payment processing system 140 can make the backing instrument selection and conduct the transaction with the selected backing instrument.

In block 230, the payment processing system 140 receives a selection of an alternative payment instrument to use in the transaction with the merchant system 130 from the user 101. The selection of an alternative payment instrument is optional for the user 101. The user 101 may decide to use the payment instrument that is recommended or is the default payment instrument. In the example, the user 101 can conduct the transaction with the selected backing instrument or the user 101 can indicate to the digital wallet application module 111 that an alternate backing instrument is preferred. For example, the user 101 can access a list of backing instruments on the user computing devise 110. The list of backing instruments can be presented on the digital wallet application module 111 and the user 101 can select a backing instrument that is different from the backing instrument selected by the payment processing system 140. Any other manner of choosing and selecting an alternate backing instrument can be employed by the user 101 and the digital wallet application module 111.

In an alternate example, the digital wallet application module 111 can make a request to the user 101 to provide a selection of a backing instrument after the transaction is initiated with the merchant system 130. For example, the user 101 can tap the user device 110 against a POS terminal 134 or the user 101 can swipe a magnetic stripe at a POS terminal 134. Then, the digital wallet application module 111 can ask the user 101 to make a selection of a backing instrument after the transaction is initiated. The digital wallet application module 111 can display a message to the user 101 to select the backing instrument. Alternatively, the POS terminal 134 can display the message to the user 101 to select a backing instrument. The user 101 can select the backing instrument on the user device 110, the POS terminal 134, or another suitable location. For example, the user 101 can select a backing instrument from a list on the digital wallet application module 111.

The user 101 can input the backing instrument selection into the digital wallet application module 111, into a user interface of the payment processing system server 144, or any other suitable user interface. The payment processing system 140 can receive the selection and stored the selection in a database, on the on the data storage unit 147, or any suitable data storage location. The backing instrument selection may be stored in a location that the payment processing system 140 can access for use in producing or modifying the model of the user 101 and for use in making future backing instrument selections and recommendations.

In block 235, the user 101 can conduct the proxy card transaction with the merchant system 130 using the alternate backing instrument as the backing instrument. That is, the user device 110 can transmit the proxy card information to the POS terminal 134, and the merchant system 130 can conduct the transaction with the payment processing system 140. For example, the user 101 can transmit the proxy card information via an NFC, BLUETOOTH, barcode, Wi-FI, infrared or other wireless transmission technology to the POS terminal 134. Alternatively, the user can provide a magnetic stripe card to the POS terminal 134. Any suitable manner of providing the proxy card information to the merchant system 130 can be utilized.

The merchant system 130 can recognize that the proxy card is associated with the payment processing system 140 and can contact the payment processing system 140. The merchant system 130 can provide the transaction request and transaction details to the payment processing system 140 and the transaction can be conducted. The payment processing system 140 can create a second transaction request with the issuer of the selected backing instrument and conduct a second transaction with the issuer of the selected backing instrument. After receiving an authorization for the transaction from the issuer of the selected backing instrument, the payment processing system 140 can provide an authorization for the transaction request from the merchant system 130. In an alternate example, the merchant system 130 can provide the transaction request to a card network and the card network can recognize that the payment processing system 140 is the issuer of the proxy card. Any other participant of the transaction can recognize the proxy card and direct the transaction request to the payment processing system 140.

In block 240, the payment processing system 140 incorporates the circumstances of the transaction into a card selection model of the user 101. The digital wallet application module 111 can log the circumstances of the transaction and the alternate backing instrument selected by the user 101. The circumstances can be stored in the user account on the digital wallet application module 111 and/or the payment processing system 140. The circumstances can include any information associated with the transaction, such as the location of the merchant system 130, the identity of the merchant system 130, the category of the merchant system 130, the time of day, the day of the week, the season of the year, the environmental conditions, or an other suitable information.

In block 245, the payment processing system 140 utilizes the card selection model in future transactions. The stored information can be included in a model of user preferences to be utilized in future card selections and recommendations. As the model gathers more useful information regarding the selections and preferences of the user 101, the payment processing system 140 can make better backing instrument selections for the user 101. For example, the model may determine that while the user 101 indicated a preference to use a particular credit card associated with an employer as the backing instrument, the user 101 may prefer to use a personal credit card on the weekend. In another example, the model may determine that while the user 101 indicated a preference to use a travel rewards credit card as the backing instrument for most restaurant purchases, the user 101 prefers a personal debit card at coffee shops. In another example, the model may determine that the user 101 prefers to use a business credit card as the backing instrument for all expenses when traveling to a particular city, such as the location of the corporate office of the employer of the user 101. Any other suitable determinations may be predicted by the model based on the information logged with transactions of the user 101.

The model can determine from the actions of the user 101 that a rule should be ignored or modified in certain circumstances. The payment processing system 140 can use the model for selecting a backing instrument during future transactions. In an example, a user 101 may have established a rule that selects a particular backing instrument for all airline flights. However, in the previous two transactions with a particular airline, the user 101 has changed the backing instrument to an alternate backing instrument. The model can recognize a subsequent pending transaction with the particular airline, and the payment processing system 140 can select the alternate backing instrument instead of the backing instrument the rule would have required.

Alternatively, the payment processing system 140 can direct the digital wallet application module 111 to provide the alternate backing instrument as an option to the user 101. For example, the digital wallet application module 111 can indicate which backing instrument would be selected by the rules, but offer the user 101 an optional backing instrument based on history of the user 101 with the particular airline.

In an alternate example, the payment processing system 140 can provide a recommendation to the user 101 to override the rules for a certain period of time based the situation of the user 101. The determination can be made based on a set of conditions recognized by the model. For example, the model may recognize that the circumstances of the user 101 indicate that a business trip is ongoing. The model may determine that user 101 is on a business trip based on the location of the user, the repeated use of a company credit card, the merchant systems 130 frequented, or any other circumstance received by the model. The digital wallet application module 111 can display an option to the user 101 to override the rules and employ a company credit card or a set of cards with until the user 101 returns to the city of residence of the user 101 or until the user 101 cancels the overriding of the rules. The user 101 can select the option to change to the company credit card and enter the selection into the digital wallet application module 111. In another example, the payment processing system 140 can recognize that the user 101 is in a location that indicates that the user 101 is on a vacation. The digital wallet application module 111 can display an option to the user 101 to override the rules and employ a travel rewards credit card until the user returns to the city of residence of the user 101 or until the user 101 cancels the overriding of the rules. Any other set of user circumstances can be recognized by the payment processing system 140 that cause the to digital wallet application module 111 to provide the user 101 with a request to suspend or alter the rules.

In an alternate embodiment, the payment processing system 140 can allow the user 101 to maintain more than one model. That is, the user 101 may have a model for weekends, a different model for weekdays, a different model for vacations, or a model for any other aspect of the user's 101 activities. The user 101 or the payment processing system 140 can establish different rules for the different models, and the payment processing system 140 can modify the rules for the different models as described herein. In an example embodiment, the models can be determined based on a set of conditions recognized by the model. The payment processing system 140 can recognize that a different model would be more appropriate based on the activities of the user 101, and recommend to the user 101 to switch the model being utilized.

In an example, the payment processing system 140 may recognize that the circumstances of the user 101 indicate that a business trip is ongoing. The model may determine that user 101 is on a business trip based on the location of the user, the repeated use of a company credit card, the merchant systems 130 frequented, or any other circumstance received by the model. The digital wallet application module 111 can display an option to the user 101 to switch to a business travel model of the user 101. The user 101 can select the option to change to the business travel model and enter the selection into the digital wallet application module 111. In another example, the payment processing system 140 can recognize that the user 101 is in a location that indicates that the user 101 is on a vacation. The payment processing system 140 can automatically switch to the corresponding model for the user. Alternatively, the digital wallet application module 111 can display an option to the user 101 to switch to a vacation model of the user 101 until the user returns to the city of residence of the user 101 or until the user 101 cancels the overriding of the rules. Any other set of user circumstances can be recognized by the payment processing system 140 that cause the to digital wallet application module 111 to provide the user 101 with a request to suspend or alter the rules.

In another example, the user 101 selects a different model by making a selection of the model to be utilized before the user 101 begins a business trip, vacation, weekend, or any other activity or time frame that would require a different model. In another example, the model to be used can be scheduled based on a calendar or other time based program. For example, the user 101 can configure the payment processing system 140 to use a business model during working hours and switch to a personal model after hours and on the weekends.

In an alternate embodiment, all of the processes can be performed in an online transaction. The user computing device may attempt a transaction with an online merchant system 130. The merchant system 130 can submit the transaction and the merchant details. The payment processing system 140 can determine the conditions of the transaction, such as the identity of the merchant system 130, the category of the merchant system 130, the time of day, the day of the week, the season of the year, or other suitable information. The backing instrument selection and any alternate backing instrument selection by the user 101 can be performed in a similar manner to the example embodiments described herein.

Example Systems

Figure 3:
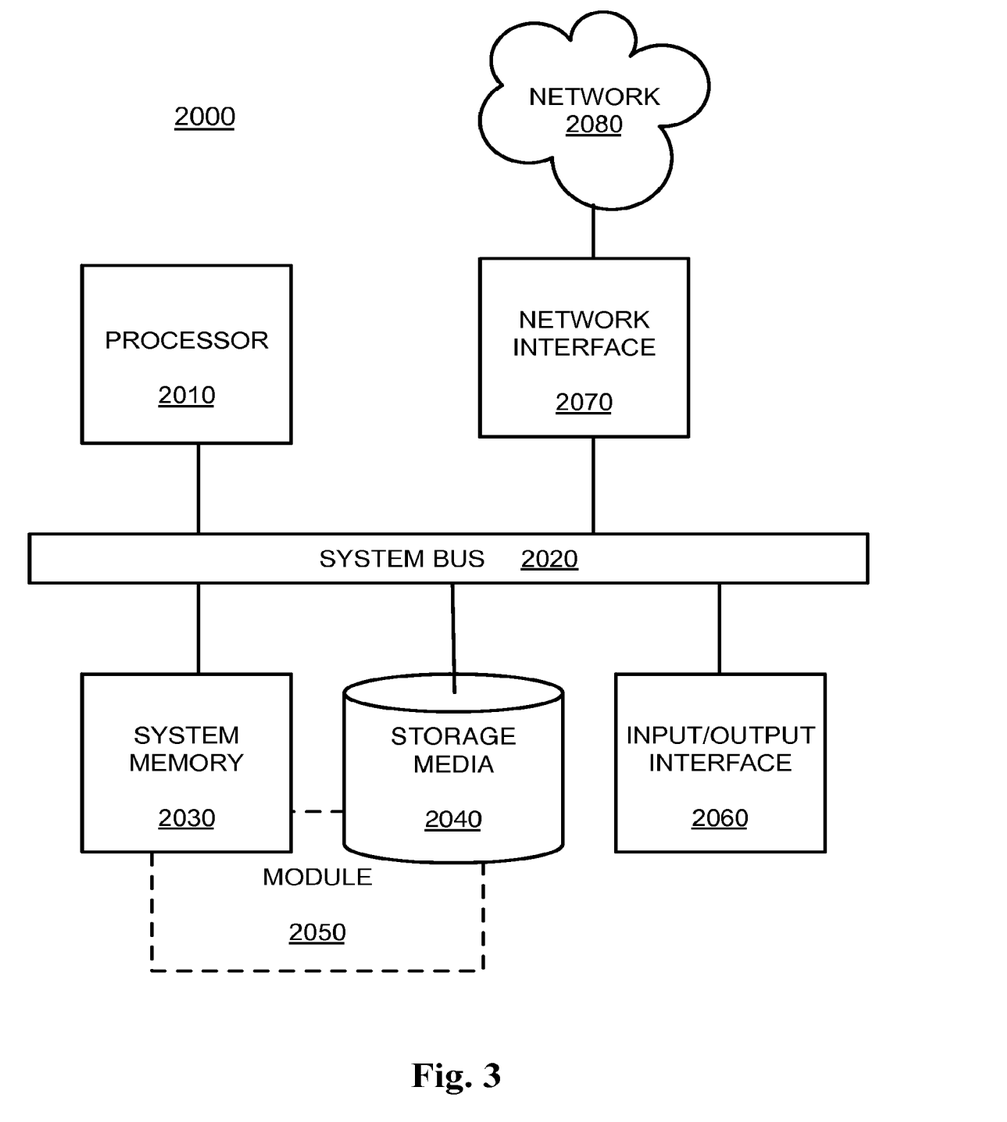
FIG. 3 is a block diagram depicting a computing machine and a module, in accordance with certain example embodiments.

FIG. 3 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to select payment accounts for financial card transactions, comprising:

associating, by a user computing device, a plurality of financial accounts with a user account, the user account being maintained by the user computing device;

establishing, by the user computing device, an instrument selection model for the user account based at least in part on configuration data received from a user associated with the user account, wherein the instrument selection model comprises information for identifying a which particular financial account from among the plurality of financial accounts to use as a selected financial account for a transaction using the user account;

receiving, by the user computing device, data associated with a first pending transaction with a first merchant, the first pending transaction being conducted between a first merchant computing device and the user, the data comprising information regarding the first pending transaction and information provided to the first merchant computing device to identify the user account;

identifying, by the user computing device, a first financial account from among the plurality of financial accounts to use as the selected financial account for the first pending transaction based at least in part on the instrument selection model and the first pending transaction data;

receiving, by the user computing device, an input of a selection of an alternate financial account to use instead of the first financial account as the selected financial account for the first pending transaction;

logging, by the user computing device, the data associated with the first pending transaction and the alternate financial account;

modifying, by the user computing device, the instrument selection model for the user account based on the selection of the alternate financial account and the data associated with the first pending transaction;

receiving, by the user computing device, data associated with a subsequent pending transaction with a subsequent merchant, the subsequent pending transaction being conducted between a subsequent merchant computing device and the user, the subsequent transaction data comprising information regarding the subsequent pending transaction and information provided to the subsequent merchant computing device to identify the user account; and executing, by the user computing device, the modified updated instrument selection model to identify the alternate financial account to use as the selected financial account for the subsequent pending transaction instead of the first financial account.

2. The computer-implemented method of claim 1, wherein the first pending transaction data and the subsequent pending transaction data comprises one or more of location data identifying a location of the user computing device, an identity of the first merchant or the subsequent merchant, a category of the first merchant or the subsequent merchant, a time of day for the first pending transaction and the subsequent pending transaction, a day of week for the first pending transaction and the subsequent pending transaction, and a season of year.

3. The computer-implemented method of claim 1, wherein the instrument selection model is further established based on rules received from the user, the rules comprising instructions for selecting a financial account as the selected financial account.

4. The computer-implemented method of claim 3, further comprising:

presenting, by the user computing device, the first financial account selected from among the plurality of financial accounts to use as the selected financial account for the first pending transaction based at least in part on the rules received from the user;

determining, by the user computing device, that a second financial account from among the plurality of financial accounts to use as the selected financial account for the first pending transaction is identified based at least in part on of the instrument selection model and the first pending transaction data, the second financial account being different than the first financial account; and presenting, by the user computing device, the first and second financial accounts to the user and an option to select a preferred financial account to use in the first pending transaction.

5. The computer-implemented method of claim 3, further comprising:

determining, by the user computing device, from a situation of the user that the instrument selection model for the user should be suspended; and presenting, by the user computing device, an option to the user to suspend the instrument selection model and an option to select a financial account for a predetermined period of time, the financial account being selected for use in all transactions until the predetermined period of time elapses or a request to reinstate the instrument selection model is received.

6. The computer-implemented method of claim 3, further comprising:

determining, by the user computing device, based on a situation of the user that the instrument selection model for the user should be suspended; and presenting, using the user computing device, an option to the user to suspend the instrument selection model and an option to employ a second instrument selection model, the second instrument selection model being established based on a second set of rules received from the user, the rules comprising instructions to select a second financial account as the selected financial account.

7. The computer-implemented method of claim 1, wherein the information to identify the user account is provided to the first merchant computing device by the user computing device associated with the user account.

8. The computer-implemented method of claim 1, wherein the information to identify the user account is provided to the first merchant computing device by a magnetic stripe card.

9. The computer-implemented method of claim 1, wherein the first merchant and the subsequent merchant are the same merchant.

10. The computer-implemented method of claim 1, wherein determining that the subsequent pending transaction has similar transaction data as the data associated with the first pending transaction comprises determining one or more of the following: the first merchant and the subsequent merchant are the same merchant, a category of the first merchant and the subsequent merchant are the same, a product being purchased in the first pending transaction and the subsequent pending transaction are substantially the same, and the location of the first pending transaction and the subsequent pending transaction are substantially the same.

11. A computer program product, comprising:

a non-transitory computer-readable storage device having computer-executable program instructions embodied thereon that when executed by a computer cause the computer to select payment instruments for financial card transactions, the computer-executable program instructions comprising instructions to:

associate a plurality of financial accounts with a user account, the user account being maintained by a user computing device;

establish a card selection model for the user account based on configuration data received from a user associated with the user account, wherein the card selection model comprises information for identifying a particular financial account from among the plurality of financial accounts to use as a backing instrument for a transaction using the user account;

receive data associated with a first pending transaction with a first merchant, the first pending transaction being conducted between a first merchant computing device and the user, the data comprising information regarding the first pending transaction and information provided to the first merchant computing device to identify the user account;

identify a first financial account from among the plurality of financial accounts to use as the backing instrument for the first pending transaction based at least in part on the card selection model and the first pending transaction data;

receive an input of a selection of an alternate financial account to use instead of the first financial account as the backing instrument for the first pending transaction;

log the data associated with the first pending transaction and the selected, alternate financial account;
modify the card selection model for the user account based on the selection of the alternate financial account and the data associated with the first pending transaction;
receive data associated with a subsequent pending transaction with a subsequent merchant, the subsequent pending transaction being conducted between a subsequent merchant computing device and the user, the subsequent transaction data comprising information regarding the subsequent pending transaction and information provided to the subsequent merchant computing device to identify the user account; and
execute the modified card selection model to identify the alternate financial account to use as the backing instrument for the subsequent pending transaction instead of the first financial account.

12. The computer program product of claim 11, wherein the data associated with the first pending transaction comprises one or more of location data identifying a location of the user computing device, an identity of the first merchant, a category of the first merchant, a time of day for the first pending transaction, a day of week for the first pending transaction, and a season of year.

13. The computer program product of claim 11, wherein the card selection model is further established based on rules received from the user, the rules comprising instructions for selecting a financial account as the backing instrument.

14. The computer program product of claim 13, further comprising computer-executable program instructions to:
present the first financial account selected from among the plurality of financial accounts to use as the backing instrument for the first pending transaction based at least in part on the rules received from the user;
determine that a second financial account from among the plurality of financial accounts to use as the backing instrument for the first pending transaction is identified based at least in part on the card selection model and the first pending transaction data, the second financial account being different than the first financial account; and
present the first and second financial accounts to the user and an option to select a preferred financial account to use in the first pending transaction.

15. The computer program product of claim 13, further comprising computer-executable program instructions to:
determine based on from a situation of the user that the card selection model for the user should be suspended; and
present an option to the user to suspend the card selection model and an option to select a second financial account for a predetermined period of time, the second financial account being selected for use in all transactions until the predetermined period of time elapses or a request to reinstate the card selection model is received.

16. The computer program product of claim 11, wherein the information to identify the user account is provided to the first merchant computing device and the subsequent merchant computing device by the user computing device associated with the user account.

17. The computer program product of claim 11, wherein the information to identify the user account is provided to the first merchant computing device by a magnetic stripe card.

18. A system to select payment instruments for card transactions comprising:
a storage resource; and
a processor communicatively coupled to the storage resource, wherein the processor executes application code instructions that are stored in the storage resource to cause the system to:
associate a plurality of financial accounts with a user account, the user account being maintained by the processor;
establish a model for the user account based on configuration data received from a user associated with the user account, wherein the model comprises information for identifying a particular financial account from among the plurality of financial accounts to use as a backing instrument for a transaction using the user account;
receive data associated with a first pending transaction with a first merchant, the first pending transaction being conducted between a first merchant computing device and the user, the data comprising information regarding the first pending transaction and information provided to the first merchant computing device to identify the user account;
identify a first financial account from among the plurality of financial accounts to use as the backing instrument for the first pending transaction based at least in part on the model and the first pending transaction data;
receive an input of a selection of an alternate financial account to use instead of the first financial account as the backing instrument for the first pending transaction;
log the data associated with the first pending transaction and the alternate financial account;
modify the model for the user account based on the selection of the alternate financial account and the data associated with the first pending transaction;
receive data associated with a subsequent pending transaction with a subsequent merchant, the subsequent pending transaction being conducted between a subsequent merchant computing device and the user, the subsequent transaction data comprising information regarding the subsequent pending transaction and information provided to the subsequent merchant computing device to identify the user account; and
execute the modified model to identify the alternate financial account to use as the backing instrument for the subsequent pending transaction instead of the first financial account.

19. The system of claim 18, wherein the data associated with the first pending transaction comprises one or more of location data identifying a location of a user computing device, an identity of the first merchant, a category of the first merchant, a time of day for the first pending transaction, a day of week for the first pending transaction, and a season of year.

20. The system of claim 18, wherein the model is further established based on rules received from the user, the rules comprising instructions for selecting the particular financial account as the backing instrument.

21. The system of claim 20, the processor executing further application code instructions that are stored in the storage device and that cause the system to:
present the first financial account selected from among the plurality of financial accounts to use as the backing instrument for the first pending transaction based at least in part on the rules received from the user;
determine that a second financial account from among the plurality of financial accounts to use as the backing instrument for the first pending transaction is identified based at least in part on the model and the first pending transaction data, the second financial account being different than the first financial account; and
present the first and second financial accounts to the user and an option to select a preferred financial account to use in the first pending transaction.

* * * * *